United States Patent [19]

Kawasaki et al.

[11] 4,079,397
[45] Mar. 14, 1978

[54] CONTROL CIRCUIT FOR MOTOR-DRIVE CAMERAS

[75] Inventors: Masahiro Kawasaki; Akihiro Arai, both of Tokyo; Eiichi Tano, Asaka, all of Japan

[73] Assignee: Asahi Kogaku Kogyo Kabushiki Kaisha, Tokyo, Japan

[21] Appl. No.: 725,062

[22] Filed: Sep. 21, 1976

[30] Foreign Application Priority Data

Sep. 22, 1975 Japan .................. 50-114602

[51] Int. Cl.² .................. G03B 1/00; G03B 17/42
[52] U.S. Cl. .................. 354/173; 354/204
[58] Field of Search .............. 354/170, 171, 173, 204; 352/121, 137, 169

[56] References Cited

U.S. PATENT DOCUMENTS

| | | | |
|---|---|---|---|
| 3,813,681 | 5/1974 | Sahara | 354/173 |
| 3,903,466 | 9/1975 | Kondo | 354/173 X |
| 3,973,268 | 8/1976 | Arai | 354/173 |
| 3,980,400 | 9/1976 | Maida | 354/173 X |

*Primary Examiner*—L. T. Hix
*Assistant Examiner*—William B. Perkey
*Attorney, Agent, or Firm*—Sughrue, Rothwell, Mion, Zinn and Macpeak

[57] ABSTRACT

A circuit is disclosed for controlling the drive motor of a motor driven camera in a single frame shot mode, A continuous shooting mode and a bulb mode. The circuit includes provision for controlling the camera from a plurality of positions. A release circuit controls the motor until the shutter is released. Then a film winding circuit controls. The time constant of the film winding circuit may be varied to control the duration between successive shots in a continuous shot mode. For a single shot mode, the film winding circuit is effectively blocked from operating the motor until the release button is no longer depressed.

12 Claims, 2 Drawing Figures

CONTROL CIRCUIT FOR MOTOR-DRIVE CAMERAS

BACKGROUND OF THE INVENTION

This invention relates a motor driven camera, and more particularly to a control circuit for a motor-driven camera, which enables control under several operational modes, such as a single frame shot mode or a continuous shot mode from any of a plurality of positions or control stations.

It is well known to provide motor drive mechanisms for cameras. Typically such mechanisms include a motor which is controlled in its on and off states by the operator. When the motor is on it actuates a sequence of operations as follows; the shutter release operation is initiated, the film is wound and the release is reset or cocked. For continuous shot operation the motor continues to rotate to repeat the sequence until the operator turns off the motor by removing his finger from a control button or the like. For single shot operation the motor automatically stops after each film winding operation and remains stopped until the operator initiates a new operation.

SUMMARY OF THE INVENTION

It is an object of the present invention to provide a control circuit for a motor of a motor driven camera which control circuit allows selection of continuous operation or single shot operation.

It is a further object to provide such a circuit which also is compatable with bulb operation.

It is a further object to provide such a circuit which can selectively vary the duration between shots during continuous shot operation.

It is a still further object to provide such a circuit which can be independently controlled from a plurality of locations or positions.

These objects are achieved by providing a circuit wherein a relay for controlling energization of the motor which drives the camera is switched between a release circuit and a film winding circuit. The release circuit energizes the relay when a main switch is closed and when the relay is connected thereto. After the shutter releases, the relay is switched to the film winding circuit. The latter circuit is variable in function. It can prevent energization of the relay until the main switch opens, thereby insuring single shot operation. It can also vary the time between the instant the relay connects with the film winding circuit and the instant the relay is energized, thereby controlling the duration between shots in a continuous shot operation.

DETAILED DESCRIPTION OF THE PREFERRED EMBODIMENTS

Figure 1:
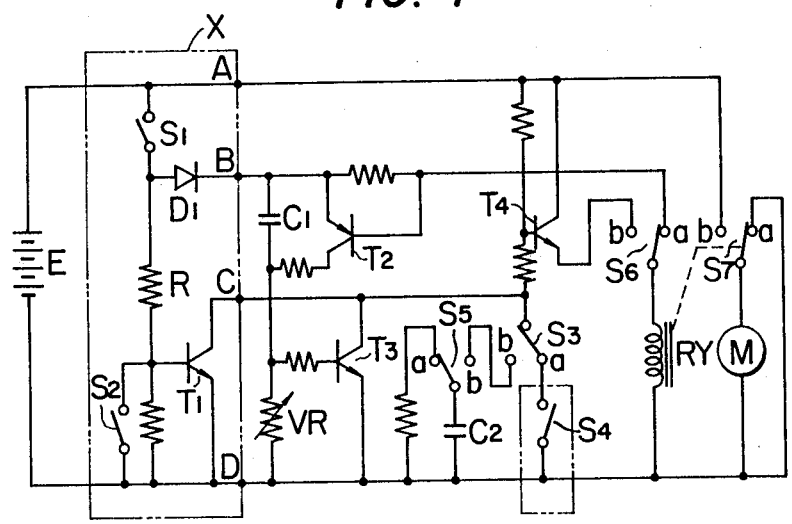
FIG. 1 is a circuit diagram showing an example constituting a basic motor drive arrangement to which the present invention is applicable.

FIG. 1 shows an embodiment of the invention having a single operative position for explaining the fundamentals of the control circuit, wherein M designates an electric motor which is connected to an electrical power source E through a switch $S_7$. When a relay RY is not energized, the switch $S_7$ is placed at a position $a$ short-circuiting the motor M. When the relay RY is energized, the switch $S_7$ is changed-over to position $b$ where the motor M is connected to the power source E, and the camera is operated through a known type of mechanism, such as that disclosed in U.S. Pat. No. 3,448,670 issued to Suzuki on June 10, 1969, to wind the film or carry out the shutter release operation. When the relay RY is again brought back to the deenergized state, the switch $S_7$ returns to the position $a$, short-circuiting the motor M and braking it.

In other words, the relay RY and the electric motor M are operated in correspondence with each other. A switch $S_6$ is operable to transfer between a position $a$ connecting the relay RY to a release circuit and another position $b$ connecting the relay to a film winding circuit, so that the relay RY is controlled by a signal from either one of these circuits. The switch $S_6$ is transferred by a mechanism as disclosed in the aforementioned U.S. Pat. No. 3,448,670 from the position $b$ to the position $a$ upon the completion of the film winding operation, and from the position $a$ to the position $b$ upon the completion of the release operation.

The release circuit comprises a trigger switch $S_1$ closed by depression of the camera release button, a reverse-current preventing diode $D_1$, and the electric power source E. When the switch $S_6$ is at the position $a$, connecting relay RY to the release circuit, the relay RY is energized upon depression of the trigger switch $S_1$, and the electric motor M is rotated to release the shutter through a known mechanism, not shown. By the release of the shutter, the switch $S_6$ is changed-over to the position $b$ connected to the film winding circuit and the release circuit terminates its operation.

The film winding circuit comprises a first controllable switching means $T_4$ and the electric power source E. Upon conduction of the first controllable switching means $T_4$, the relay RY is operated through the switch $S_6$ to rotate the electric motor M to accomplish the film winding operation. In this embodiment, the switching means $T_4$ is a transistor which is brought into the OFF state by varying the base current. For this control, the base of the transistor is connected with a control circuit.

In the control circuit for the first controllable switching means $T_4$, there are provided three switches, one of which is a "bulb" operational switch $S_3$ ordinarily placed at a position $a$, but, during a "bulb" operation (holding the camera in an exposed state while the release button is depressed), placed at the position $b$. A shutter synchro switch $S_4$ is connected to the position $a$ of the "bulb" operation switch $S_3$, and is closed by a known type of mechanism, as commonly employed in connection with the "FP" and "X" settings of conventional synchro-flash cameras, only during the exposure period of the shutter. The switching means $T_4$ is in a nonconducting state when switches $S_3$ and $S_4$ are closed, and as a result, the motor M is inoperative during the exposure period of the shutter.

At the time of a "bulb" operation, the shutter should be released by rotating the electric motor M. However, the "bulb" operation switch $S_3$ must be placed at the position $b$ thereby eliminating the effect of the shutter synchro switch $S_4$ because the latter switch $S_4$ operates to keep the motor M at a standstill until the completion of the exposure period. Still another switch $S_5$ is provided in a circuit connected to the position $b$ of the "bulb" operation switch $S_3$, and an R-C time-constant circuit is provided in connection with the switch $S_5$. $S_5$ is operated from position $a$ to position $b$ upon recovery of the release mechanism and from position $b$ to position $a$ during the film winding operation by a mechanism as disclosed in U.S. Pat. No. 3,448,670. Thus, a predetermined duration of stop period is provided after the recovery of the release mechanism thereby to provide a delay time for the subsequent film winding operation so that the recovery of a camera mechanism, not shown (such as the recover of the mirror in the case of a single lens reflex camera), and the bound-stopping period of the camera can be obtained. Such a period is important for preventing erroneous operation of the camera at the time of the "bulb" operation.

In the control circuit, two switching elements (transistors $T_1$ and $T_3$) are further provided in parallel with the "bulb" switch $S_3$. The second controllable switching means, transistor $T_1$ and switch $S_2$ control the single shot and continuous shot modes of operation. For single frame shooting $S_2$ is open as shown. When the shutter release button is depressed and $S_1$ closes, motor M is energized to initiate the release operation. This occurs because switch $S_6$ is at terminal $a$. However, after release, when $_6$ moves to position $b$ the relay RY will not energize (and motor M will not initiate rewind operation) because the closure of $S_1$ renders the second controllable switching means conductive which, in turn, renders $T_4$ non-conductive. Thus only one shot per button depression is carried out. Circuit means including resistor R connect the switch $S_1$ to the base of transistor $T_1$, and this circuit means will render transistor $T_1$ conductive when $S_2$ is open and $S_1$ is closed.

However, when continuous shot operation is desired, switch $S_2$ is closed. This maintains the second controllable switching means $T_1$ in a non-conductive state irrespective of the condition of $S_1$, and thus $T_4$ and relay RY can be operated to cause the rewind operation to be performed.

Transistor $T_3$ along with the R-C circuit comprising capacitor $C_1$ and resistor VR and the discharge circuit comprising transistor $T_2$ controls the inter-shot duration between successive shots during continuous shot operation. Assuming $S_6$ is at position $a$, connecting the relay RY to the release circuit, the closure of $S_1$ energizes relay RY which operates motor M to initiate the release operation. The flow of current in the release circuit is detected by $T_2$ which turns on and discharges $C_1$. Upon completion of the release operation $S_6$ changes to position $b$ whereby relay RY becomes connected to the film winding circuit. $T_2$ turns off because of the open circuit of terminal $a$ of switch $S_6$. Since, at this instant the charge across $C_1$ is zero or very low, the high voltage from source E appears at the base of $T_3$ causing $T_3$ to be conducting and the first controllable switching means $T_4$ to be non-conducting. The latter keeps RY from being energized. After a time determined by the values of $C_1$ and VR, $T_3$ turns off thereby permitting switching means $T_4$ to turn on and energize relay RY, which in turn energizes motor M to initiate the film winding operation. Alteration of the value of variable resistance VR permits control of the duration between termination of a release operation and initiation of a film winding operation, and concomitantly permits control of the duration between shots.

Figure 2:
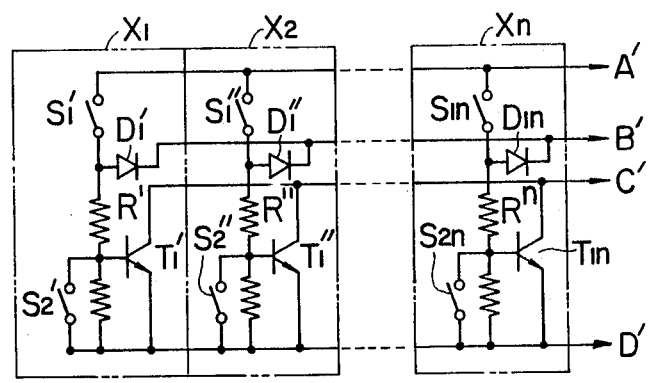
FIG. 2 is a circuit diagram showing an example of a multi-position control circuit according to this invention.

In FIG. 2, there is indicated a circuit used for operating the control circuit in the "multiposition operation." The circuit of FIG. 2 comprises a plurality of circuit blocks $X_1$ thru $X_n$ connected in parallel, each circuit block being the same as the circuit block designated by X in FIG. 1. The characters in correspondence (such as A–A', B–B', C–C', and D–D') in FIGS. 1 and 2 are connected together, respectively. Since the operations of the switches in FIG. 2 are similar to those of the corresponding switches in the circuit of FIG. 1, a detailed description thereof will be omitted. The operation in various modes thereof will now be described in detail.

(I) Single frame shot operation

So $S_2$ is open. Closing the trigger switch $S_1$, the relay RY is energized through the release circuit and the switch $S_6$ ($a$ position), and the electric motor M is thereby rotated. The shutter of the camera is released, and simultaneously therewith the switch $S_6$ is transferred to the $b$ position. Because of the operation of the second controllable switching means $T_1$ (this means is in the conducting state because the switch $S_2$ is open and the switch $S_1$ is closed), the first controllable switching means $T_4$ is brought into the non-conducting state. Since the film winding circuit is thus in the OFF state, the electric motor M stops. When the trigger switch $S_1$ is opened, the switching means $T_1$ becomes non-conductive. Since the trigger switch $S_1$ is opened, the time-constant capacitor $C_1$ is not charged, and hence the transistor $T_3$ is in OFF state.

When the shutter is in the exposing state, the shutter synchro switch $S_4$ closes thereby placing the film winding circuit in the OFF state. After a predetermined time, exposure terminates due to the shutter mechanism of the camera (not shown), and the switch $S_4$ is opened, thus placing the entire control circuit for the switching means $T_4$ in the OFF state, and first controllable switching means $T_4$ conducts. The relay RY is energized through the switch $S_6$ ($b$ position), the motor M is rotated, and the releasing mechanism (not shown) is thereby set and the film winding mechanism is operated. Upon completion of the film winding operation, the switch $S_6$ is transferred by a mechanism not shown from the position $b$ to the position $a$. The release circuit is OFF because the trigger switch $S_1$ is open, and the relay RY is de-energized to stop the electric motor M, thus completing one cycle of the single frame shot operation of the camera.

The latter description is given as if the switch $S_1$ opens before the exposure terminates. However if exposure terminates first, $S_4$ will open but the second controllable switching means $T_1$ will still be conducting and thus the first controllable switching means $T_4$ will be non-conducting and the relay RY will not be energized. The camera will remain in the standstill mode until switch $S_1$ is opened. Then switching means $T_1$ will turn off, switching means $T_4$ will conduct, RY will be energized and the motor will operate to carry out the film winding operation.

(II) Continuous shot operation

For continuous shot operation, the switch $S_2$ must be closed. At the time the trigger switch $S_1$ is closed, the relay RY is energized through the release circuit, thus rotating the electric motor M and releasing the shutter as in the case of the single frame shot operation. The switch $S_6$ is thus transferred from the position $a$ to the position $b$ connected to the film winding circuit. Although in the single frame shot operation, the operation of the control circuit has been terminated at this point by the conduction of the second controllable switching means $T_1$, in the continuous shot operation, the switching means $T_1$ is in the OFF state regardless of the operation of the trigger switch $S_1$ because of the closed condition of switch $S_2$. A current limited by the variable resistor VR flows into the capacitor $C_1$ of the time-constant circuit. At this time the transistor $T_3$ is kept in conductive state until the voltage across the capacitor $C_1$ exceeds a predetermined value. On the other hand, a function preventing the film winding operation during the exposure time of the shutter is provided by the shutter synchro switch $S_4$ interlinked with the shutter, and hence the control circuit of the first controllable switching means $T_4$ remains in the OFF state until the delay time ends or the exposure terminates, whichever occurs last. Thereafter, the switching means $T_4$ turns ON energizing the relay RY through the film winding circuit, rotating the electric motor M, setting the release, and winding the film. Upon completion of the film winding operation, the switch $S_6$ is transferred to the position $a$ connected to the release circuit. If the trigger switch $S_1$ is held closed, the relay RY is again energized through the release circuit, rotating the electric motor M, releasing the shutter, and repeating the above described operations thereby carrying out the continuous shot operation.

The continuous shot operation terminates by the opening of the trigger switch $S_1$. The opening of the same switch $S_1$ at once terminates the continuous shot operation if the switch $S_6$ is at the position $a$ connected to the release circuit. If the switch $S_6$ is at the position $b$ the operation terminates after completion of film winding and changing-over of the switch $S_6$ to the position $a$. At this time, since the trigger switch $S_1$ is open, the time-constant capacitor $C_1$ is not charged and hence the transistor $T_3$ is kept OFF. Thus, when the shutter synchro switch $S_4$ opens upon completion of the exposure, the film winding circuit instantaneously operates. This means that in the case the shot interval is selected by the time-constant circuit to be comparatively long, nevertheless it is possible to shorten the interval between a first series of continuous shots and a second series of continuous shots by simply opening and then reclosing switch $S_1$.

(III) "Bulb" Operation.

'Bulb" operation is considered to be one kind of single shot operation, but differs from ordinary single shot operation in that there is no time-determining element for exposure except the manual holding of the release button. For this reason, the continuous shot operation switch $S_2$ is open, the "bulb" switch $S_3$ is placed at the position $b$, and the shutter synchro switch $S_4$ is made inoperative. The operation is quite similar to that of the single frame shot. Upon closure of the trigger switch $S_1$, the relay RY is operated through the release circuit thereby releasing the shutter. Since the shutter mechanism of the camera is set for the "bulb" operation by conventional mechanism, the shutter is kept open during the release operation. When the trigger switch $S_1$ opens, the motor M starts to rotate because the shutter synchro switch $S_4$ has been made inoperative, thus resetting the shutter release mechanism. As a result, the switch $S_5$ is caused to change-over from the position $a$ to the position $b$ connecting the time-constant capacitor $C_2$ in the circuit of the first controllable switching means $T_4$. Thus, the switching means $T_4$ is kept OFF for a preset period by the time constant circuit, and the motor M is stopped. Since, in the single lens reflex camera, the automatic aperture control mechanism and the mirror operating mechanism are activated after the completion of the shutter operation, a rest period required after the resetting of the release in the "bulb" operation is longer than that required in the ordinary time releasing operation. The time-constant circuit provides this rest period only in the case of the "bulb" operation. After termination of this period, the film winding operation is initiated for completing the "bulb" operation after the completion of the film winding operation.

(IV) Multiposition Operation

In this case the control blocks $X_1$ through $X_n$ are connected to corresponding points of the circuit as previously described. Inasmuch as each of the blocks $X_1$ through $X_n$ in FIG. 2 is identical to block X in FIG. 1, it is possible to independently control the camera operation by any one of the blocks $X_1$ through $X_n$ by placing the mechanisms for closing switches $S_1^{1-S_1^n}$ at many locations, respectively. The diodes $D_1$ in each block prevent current which results from closure of a single switch $S_1$ from entering the other blocks. An example will illustrate the independece of the blocks. Assume $X_1$ (or at least $S_1$ of $X_1$) is at a first location, and $X_2$ (or at least $S_1$ of $X_2$) is at a second location. Further assume $S_2$ of $X_1$ is open for single shot operation and $S_2$ of $X_2$ is closed for continuous shot operation. In this case closure of $S_1$ of $X_1$ results in single shot operation. When the latter switch closes the first controllable switching means $T_1$ of $X_1$ is conducting so that film rewind cannot occur until $S_1$ opens. At this time $X_2$ will have no effect. On the other hand if $S_1$ of $X_2$ is operated by closing same ($S_1$ of $X_1$ is open if control is at $X_2$) the operation will be continuous shot operation because first controllable switching means $T_1$ of $X_2$ will remain off and allow $T_3$, VR and $C_1$ of the film wind circuit to control the time of film winding. It is noted that even though $S_2$ of $X_1$ is open, $T_1$ of $X_1$ will have no effect on the operation because diode $D_1$ of $X_1$ prevents current in the release circuit, caused by closing $S_1$ of $X_2$, from turning on $T_1$ of $X_1$. Thus multiposition independent control is possible.

It should be noted that if only single position control is used, diode $D_1$ is not required.

Thus, in the unit-body construction of the motordrive camera containing the control circuit, any of the single frame shot, continuous shot, and "bulb" shot operations can be carried out with the motor driven in synchromism with the shutter operation. When a plurality of control blocks having a simple construction are connected in parallel, a multi-position operation transferable between single frame shot and continuous shot is available.

Furthermore, since the shutter synchronous circuit and the shot-interval variation circuit are connected in parallel, continuous shot operation with preset shot interval can be maintained in the normal condition, and even in the case where the shutter speed of the camera is set at an improperly slow value, there is no possibility of winding the film during the exposure, thereby maintaining normal operation with the shot interval elongated automatically. Such a feature is particularly effective in the camera having an automatic exposure adjusting function.

Thus, according to the present invention, there is provided a control circuit for motor drive cameras which is applicable in wide fields and capable of operating in continuous shot operation and multiposition operation. In the continuous shot operation, the control circuit permits to maintain a shot interval ordinarily, and even in the case where the setting of the shot interval is improper, incorrect exposure will not result. What is claimed is:

1. A control circuit for a motor driven camera comprising, a power source, a motor for driving said camera, and relay means for controlling the energization of said motor, a release circuit, a film winding circuit, operational switch means for switching said relay between said release circuit and said film winding circuit to thereby transfer the control of energization of said relay between said release and film winding circuits, trigger switch means $S_1$ for switchably connecting said release circuit to said power source for energizing said relay when it is connected to said release circuit, said film winding circuit comprising a first controllable switching means for switchably connecting said relay to said power source when said relay is connected to said film winding circuit, second controllable switching means connected to said first controllable switching means for preventing, when in a first switching state, said first controllable switching means from connecting said relay to said power source, circuit means connected to said trigger switch and said second controllable switch means for applying a signal to place said latter switch in said first state when said trigger switch is operated, and a continuous shot/single shot mode select switch connected to said second controllable switching means for blocking the application of said signal to said second controllable switch means when said mode select switch is in a first, single shot position, whereby the position of said mode select switch determines whether said motor is energized in a continuous shot mode operation or a single shot mode operation.

2. A control circuit as claimed in claim 1 wherein said trigger switch, said second controllable switching means, said circuit means, and said mode select switch constitute a control block, and wherein said control circuit further comprises a plurality of said control blocks connected in parallel with each other for independently controlling the mode and operating condition of said control circuit, each said control block further comprising a unilateral conducting means connected between the respective control block trigger switch and a common connection point of said release circuit to prevent current in said release circuit from backing into any of said control blocks.

3. A control circuit as claimed in claim 1 wherein said film winding circuit further comprises a shutter syncro switch, adapted to be connected in parallel with said second controllable switching means, for preventing, when so connected, the said first controllable switching means from connecting said relay to said power source during the exposure duration of said shutter.

4. A control circuit as claimed in claim 2 wherein said film winding circuit further comprises a shutter syncro switch, adapted to be connected in parallel with said second controllable switching means, for preventing, when so connected, the said first controllable switching means from connecting said relay to said power source during the exposure duration of said shutter.

5. A control circuit as claimed in claim 1 wherein said film winding circuit further comprises a variable time constant inter-shot duration control means connected to said first controllable switching means for preventing said first controllable switching means from connecting said relay to said power source for a controllable variable period of time after said operation switch connects said relay to said film winding circuit.

6. A control circuit as claimed in claim 2 wherein said film winding circuit further comprises a variable time constant inter-shot duration control means connected to said first controllable switching means for preventing said first controllable switching means from connecting said relay to said power source for a controllable variable period of time after said operation switch connects said relay to said film winding circuit.

7. A control circuit as claimed in claim 5 wherein said variable time constant inter-shot duration control means is connected to said release circuit and energized only when said trigger switch is operated whereby said time constant means is inoperable when said trigger switch is open, said time constant means comprising an RC circuit adapted to begin charging and start the said period in response to said relay being connected to said film winding circuit, and resetting means for resetting said RC circuit in response to said relay being connected to said release circuit.

8. A control circuit as claimed in claim 6 wherein said variable time constant inter-shot duration control means is connected to said release circuit and energized only when said trigger switch is operated whereby said time constant means is inoperable when said trigger switch is open, said time constant means comprising an RC circuit adapted to begin charging and start the said period in response to said relay being connected to said film winding circuit, and resetting means for resetting said RC circuit in response to said relay being connected to said release circuit.

9. A control circuit as claimed in claim 7 wherein said film winding circuit further comprises a shutter synchro switch, adapted to be connected in parallel with said second controllable switching means, for preventing, when so connected, the said first controllable switching means for connecting said relay to said power source during the exposure duration of said shutter, whereby the second controllable switching means has priority over said synchro switch and said time constant means in controlling said first controllable switching means provided said mode select switch is in the single shot mode position, and whereby the priority of control of said synchro switch and said time constant means depends on whether said exposure time or said variable period is longer, provided said mode select switch is in the continuous mode position.

10. A control circuit as claimed in claim 8 wherein said film winding circuit further comprises a shutter synchro switch, adapted to be connected in parallel with said second controllable switching means, for preventing, when so connected, the said first controllable switching means from connecting said relay to said power source during the exposure duration of said shutter, whereby the second controllable switching means has priority over said synchro switch and said time constant means in controlling said first controllable switching means provided said mode select switch is in the single shot mode position, and whereby the priority of control of said synchro switch and said time constant means depends on whether said exposure time or said variable period is longer, provided said mode select switch is in the continuous mode position.

11. A control circuit as claimed in claim 9 further comprising a bulb operation time constant circuit in parallel with said synchro switch and a bulb operation select switch for selectively connecting only one of the synchro switch and bulb operation time constant circuits to said first controllable switching means.

12. A control circuit as claimed in claim 10 further comprising a bulb operation time constant circuit in parallel with said synchro switch and a bulb operation select switch for selectively connecting only one of the synchro switch and bulb operation time constant circuits to said first controllable switching means.

* * * * *